United States Patent [19]
Hyttinge et al.

[11] 3,927,985
[45] Dec. 23, 1975

[54] DEVICE FOR PREPARATION OF EARTH IMPROVING SUBSTANCES FROM ORGANIC WASTE

[75] Inventors: Roy Lennart Hyttinge, Huddinge; Lars Olov Widvall, Vällingby; Anders Erik Ingvar Höök, Vallentuna, all of Sweden

[73] Assignee: Toa-Throne AB, Bromma, Sweden

[22] Filed: July 29, 1974

[21] Appl. No.: 492,470

[30] Foreign Application Priority Data
Aug. 7, 1973 Sweden............................ 7310836

[52] U.S. Cl. ................ 23/259.1; 4/111; 4/DIG. 12
[51] Int. Cl.[2] ..................... C05F 3/04; A47K 11/02
[58] Field of Search................................... 23/259.1; 71/6-9, 11-14; 4/133, DIG. 12; 210/2

[56] References Cited
UNITED STATES PATENTS

| | | | |
|---|---|---|---|
| 2,679,114 | 5/1954 | Morrison | 23/259.1 X |
| 3,136,608 | 6/1964 | Lindstrom | 23/259.1 |
| 3,808,609 | 5/1974 | Andersson et al | 71/8 X |
| 3,840,907 | 10/1974 | Sundberg | 23/259.1 X |

Primary Examiner—Morris O. Wolk
Assistant Examiner—Roger F. Phillips
Attorney, Agent, or Firm—Hammond & Littell

[57] ABSTRACT

A receptacle for the production of earth improving substances from organic waste comprising an enclosure divided into two sections, the upper section being detachably mounted on the lower section and serving the purpose of a lid for the last mentioned section, the lower section in addition comprising an inclining bottom portion and a horizontal or nearly horizontal bottom portion, and further supply ducts for air, said ducts communicating with the interior of said sections via openings and air exhaust ducts, characterized by at least part of the bottom having the form of a staircase with oblique steps and holes or slits arranged between adjacent steps, said steps being so arranged as to prevent waste material from falling down into said air supply channel.

4 Claims, 6 Drawing Figures

3,927,985

DEVICE FOR PREPARATION OF EARTH IMPROVING SUBSTANCES FROM ORGANIC WASTE

THE PRIOR ART

It is known to let a receptacle serve the purpose of receiving and storing material, which can be left to mould, by way of example kitchen waste, faecal matters, and other organic waste. In such connection it often occurs that the receiving part of the receptacle, as a rule its bottom, is provided with a so called starting bed, i.e., as a rule a non fluid compound of a known composition, as for example peat with an admixture of a microbiological compound. Provided certain conditions are fulfilled, for example a good supply of air and favourable temperature, the work of the micro organisms will rapidly yield a complete mouldering of the waste.

A certain amount of moisture must be present, and is usually supplied in the form of urine or stools, which is absorbed by the peat bed subsequently to be evaporated by the heat of the bottom layer. Thereafter it is condensed and again is supplied to the bed in the form of drops, whereby a suitable moisture content can be maintained. Water or other suitable liquid can also be used in case the quantities of urine or stools supplied should not be sufficient.

The end product must be of hygienic nature and be easy to handle permitting to be spread out on the ground as an earth improving substance.

In a known device the bottom of the receptacle has two U-shaped means, the hollow spaces of which are facing downwards. Said "tubes" serve the purpose of guiding air introduced from the outside, the intention being to permit this air to get access to the waste material from below. However, because of the waste material in a device of such design being collected below as well as on the sides of and above the tubes, the supply of air will be limited to the space surrounding the tube. With a bigger pile of waste material the aeration is made more difficult, and an utterly retarded mouldering process or a total failure of the same may be the result. In another known device an air supply duct is arranged at the lower edge of the receptacle, above which duct a grid is arranged. The grid serves to receive part of the waste, which is aerated by air from the underlying duct. However, the waste material makes its way down into the air supply duct and gradually totally obstructs the same. Also, the result here will be an utterly retarded mouldering process or no mouldering at all. Thus, if air is not supplied in sufficient quantity, and if this air cannot actively actuate the mouldering process in the whole bed of waste material to the desired extent, then the microbiological culture dies, and the risks of anaerobic microorganism growth is great. In such a case no mouldering process is taking place but a process of putrefaction.

It is an object of the present invention to provide a device of fairly small dimensions and cheap to manufacture, which can be installed directly communicating with a dwelling house as well as also in communication with a separate outhouse, and which in addition brings about a complete or nearly complete mouldering of the waste material.

The device according to the invention is intended for the production of earth improving substances of organic waste, and comprises a tank divided in two sections, the upper section being attached to the lower section in detachable mounting serving the purpose of a lid for said lower section, which lower section comprises an inclined bottom portion and a horizontal or nearly horizontal bottom portion, and supply channels for air communicating with the interior of the lower section and consequently also with the upper section via openings, outlet channels for air also being included in the design, it being considered a characteristic of the same that at least part of the bottom is shaped like stairs with inclined steps and holes or slits taken out between said steps, which are arranged in such a manner that waste material cannot make its way down into the supply ducts for air.

By means of such a device the necessary aeration of the mound of waste takes place continuously. The air emanates through the openings between the steps, which are prolonged past the respective openings in such a way that none of the waste material can fall down into the supply ducts for air.

According to another characteristic of the invention semicircular downwards open chutes are incorporated in the device, said chutes being extended in an inclined downwards direction from the upper portion of the stairlike bottom portion. Said chutes serve the purpose of means distributing the waste material. According to one embodiment the supply duct for air extends along the horizontal portion of the bottom part as well as along its inclined portion, the area of the supply duct gradually diminishing during the passage through the inclined portion. However, it has turned out to be more suitable to let the supply duct for air extend only along the inclined portion of the bottom plane, which reduces the cost of manufacturing of the device, while the desired function is maintained, the greatest area of the duct in such a design being at the upper portion of the bottom part, thereafter gradually diminishing to a zero value at the passage to the horizontal bottom portion.

Other characteristics of the invention are evident from the following description of two embodiments, chosen by way of example. Reference is made to the accompanying drawings, in which.

Figure 3:
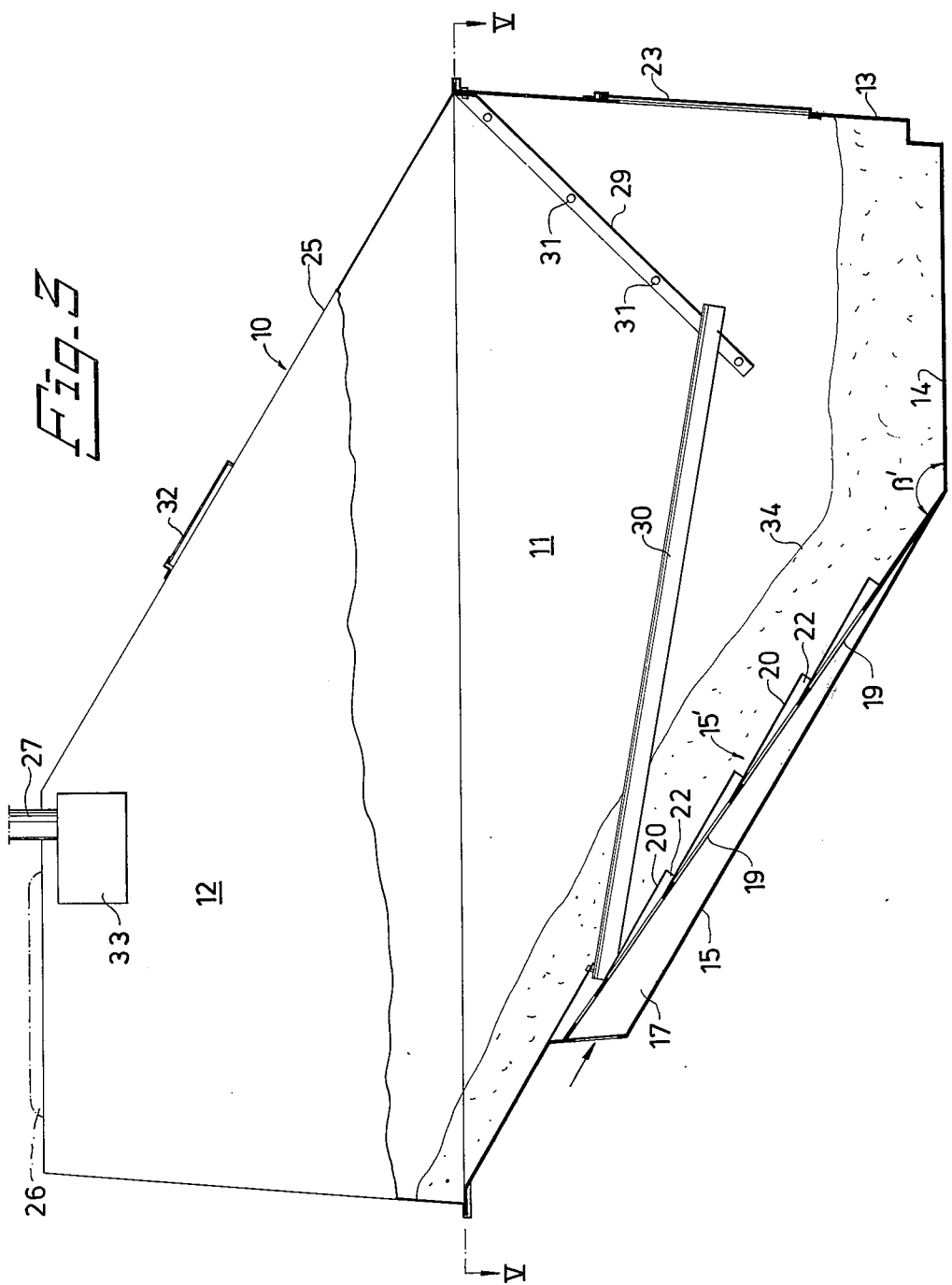

FIG. 3 also schematically in cross section and side elevation illustrates a second embodiment of the device according to the invention.

Figure 4:
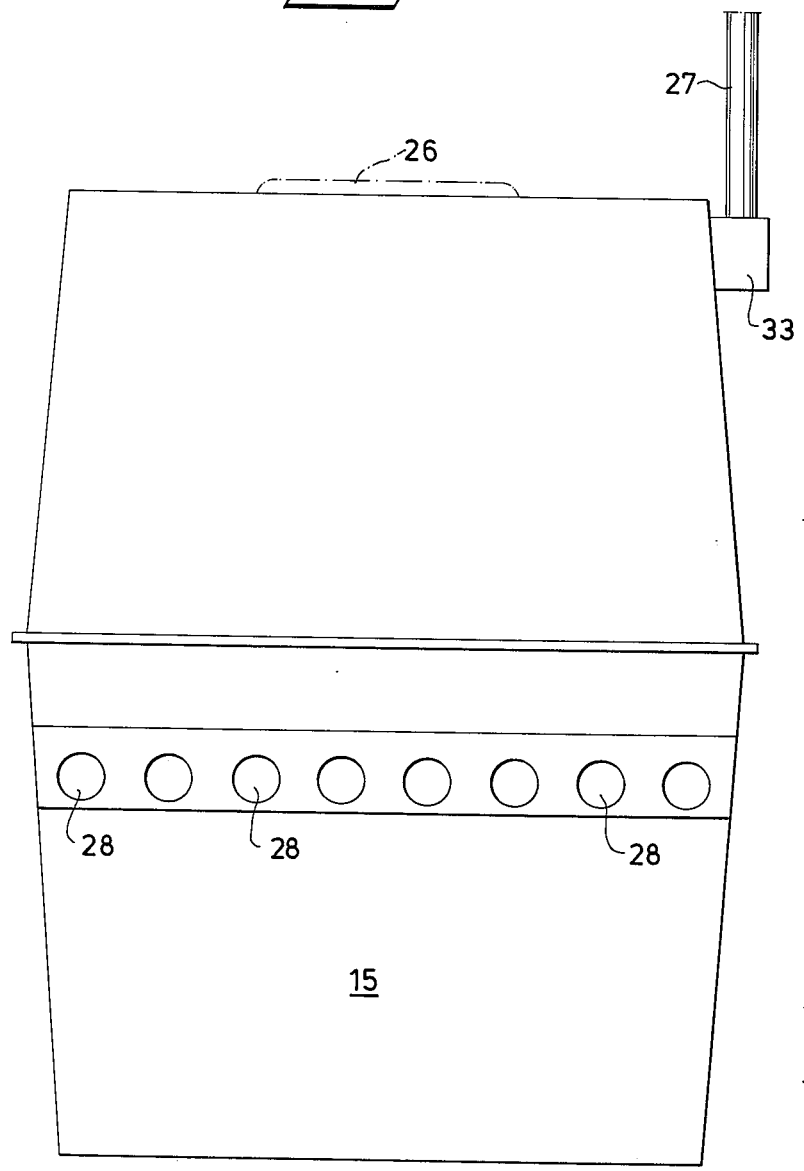

FIG. 4 is a front view of the device according to FIG. 3.

Figure 5:
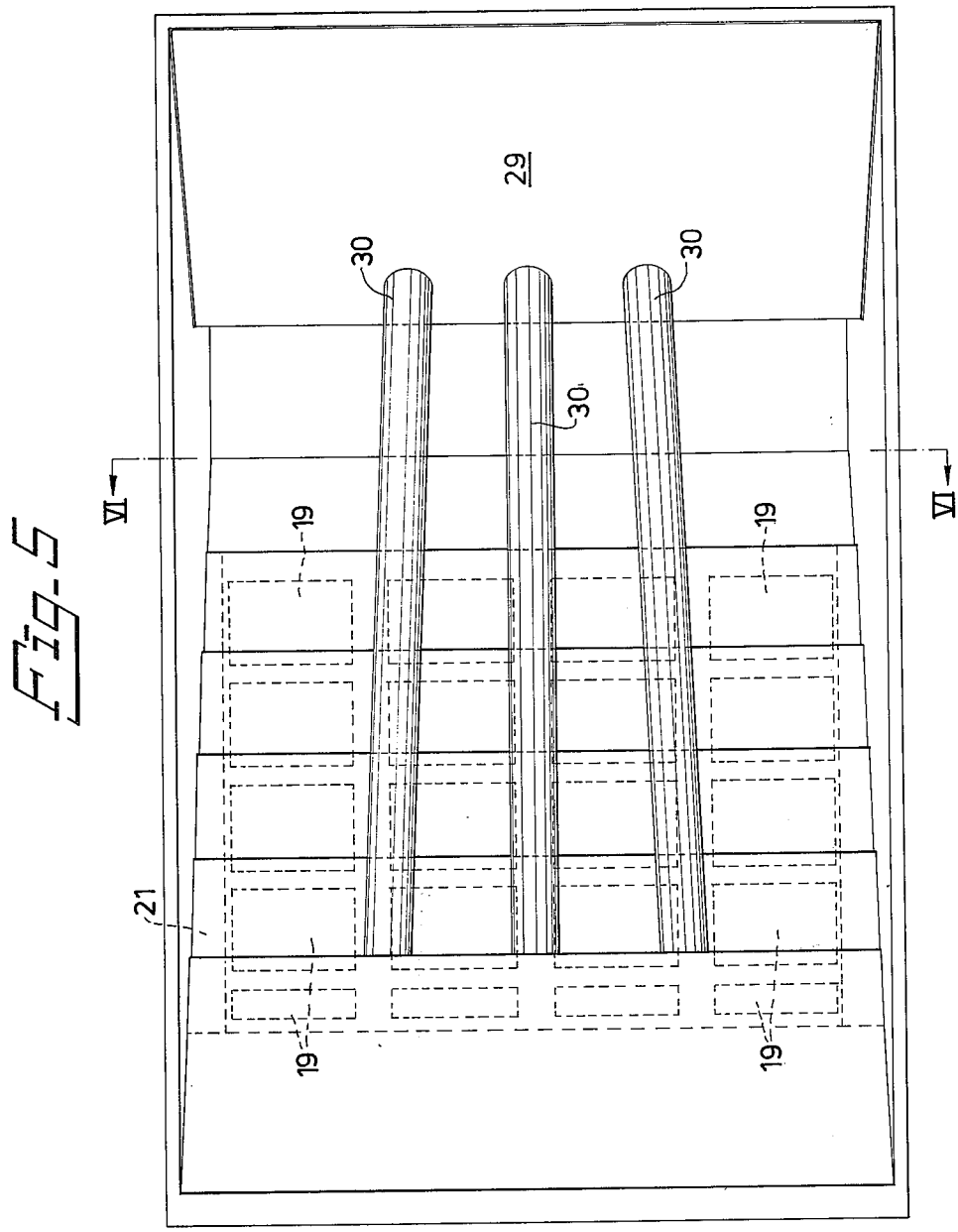

FIG. 5 is a cross sectional view along the line V—V in FIG. 3, and

Figure 6:
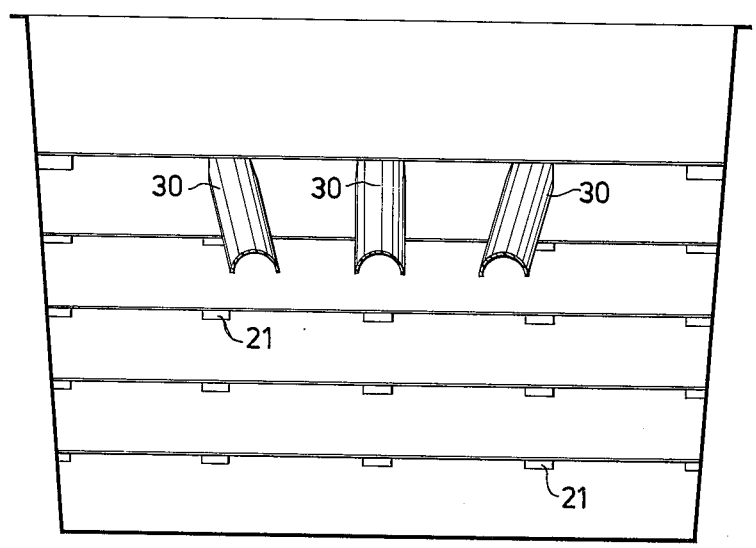

FIG. 6 is a cross sectional view along the line VI—VI in FIG. 5.

Figure 1:
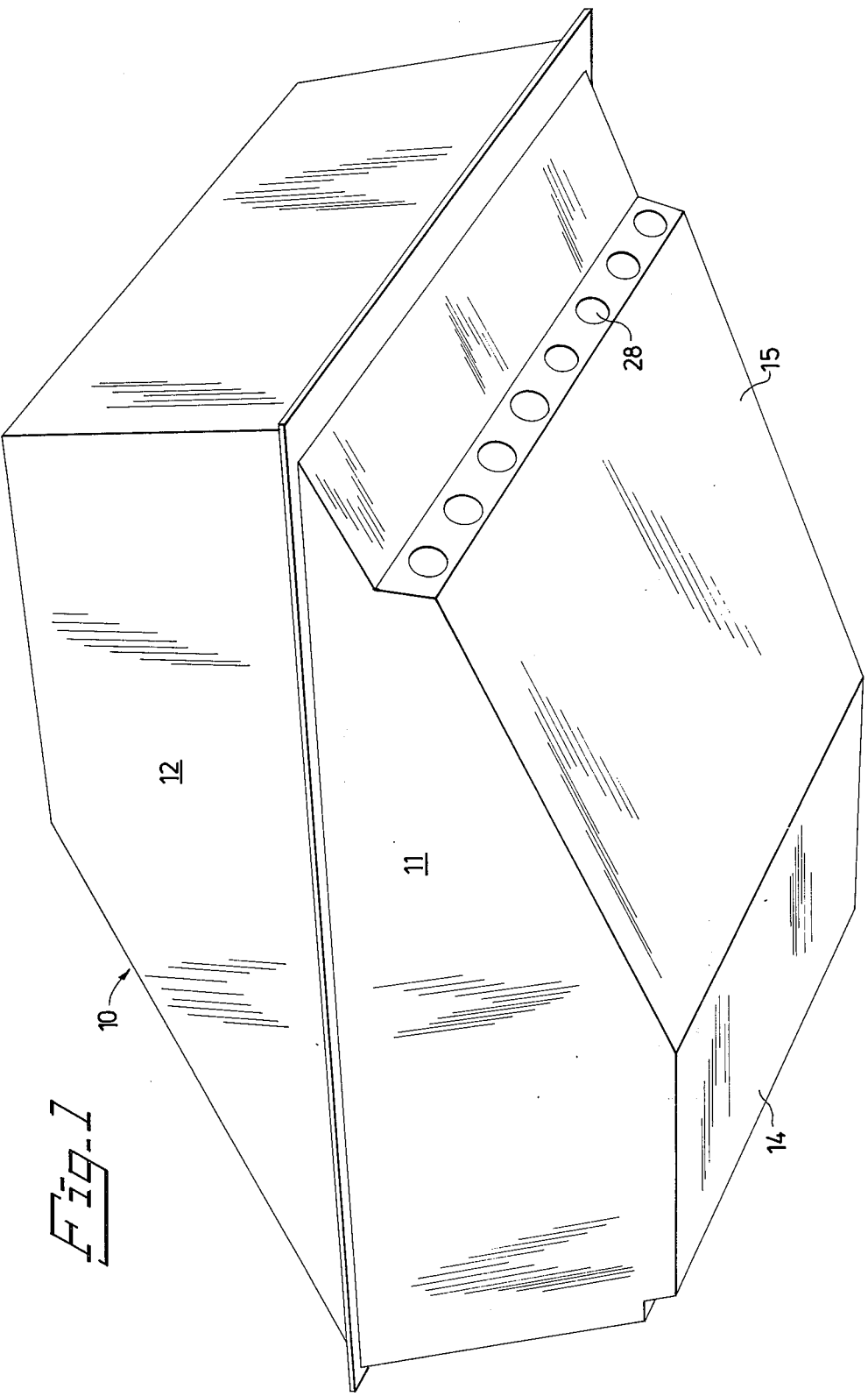
FIG. 1 is a perspective view of the device according to the invention.
Figure 2:
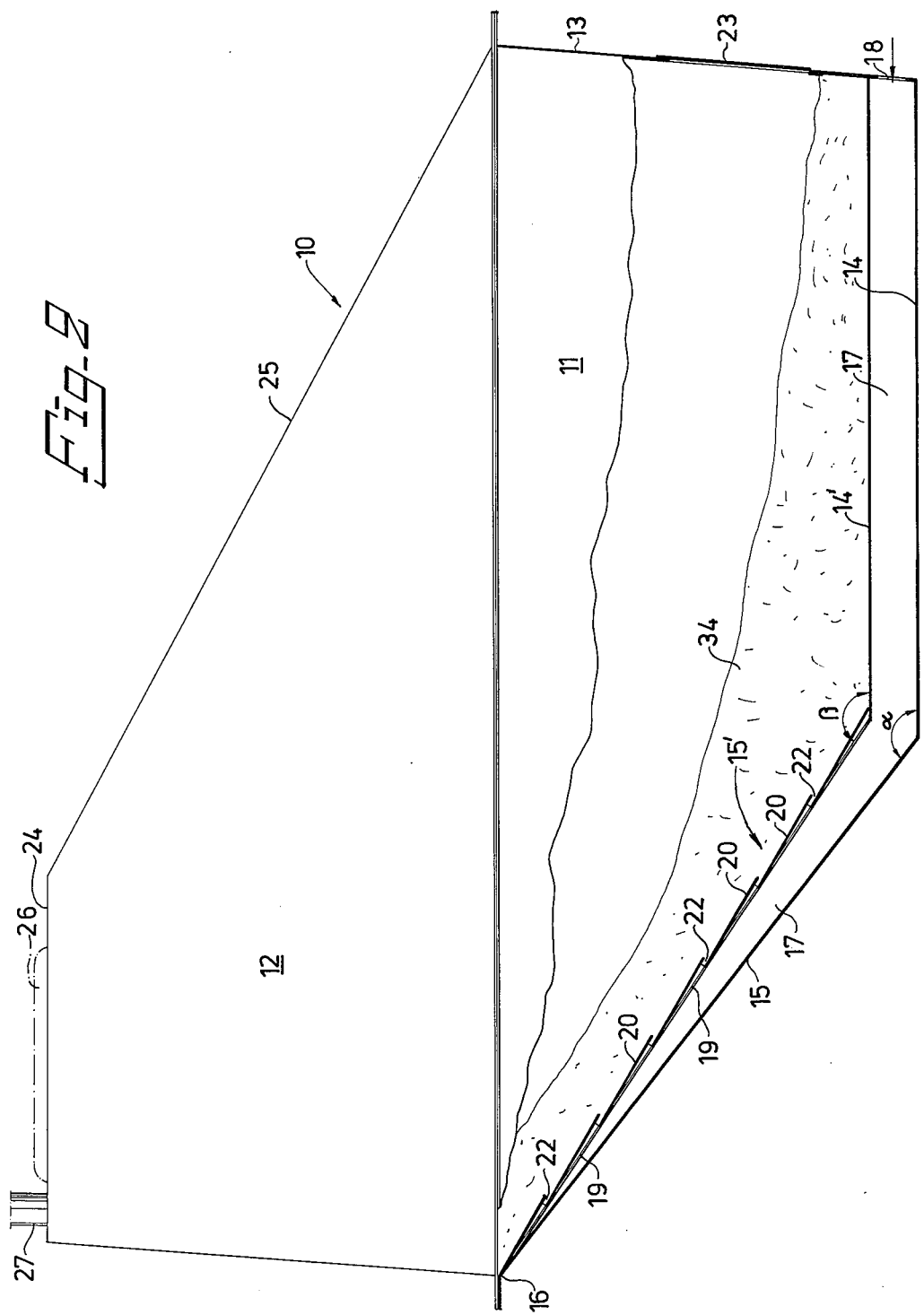
FIG. 2 is a schematical cross sectional view in side elevation of a device according to a first embodiment of the invention.

The device illustrated in the figures comprises a receptacle, generally indicated with 10 and comprising a bottom section 11 and an upper section 12, which is detachably mounted on the edge portion of the section 11, and which serves the purpose of lid for the last mentioned section. The bottom section 11 in addition to the side walls has a vertical end wall 13 and a bottom portion 14, part of which has a horizontal extension followed by a part 15, the extension of which forms an angle α relative to the horizontal portion 14. This inclined or oblique portion of the bottom part is indicated with 15 and the angle α is greater than 100°, preferably 125°–145°. According to FIG. 2 the bottom section 11 is in addition provided with a whole intermediate bottom 14' extending parallel to the bottom part and at a certain distance from the same, which intermediate bottom passes into an inclining portion, a second bottom portion, indicated with 15', the passing between the bottom portion 14' and the bottom portion 15' being indicated with the angle β', which shall be somewhat greater than the angle α. As is evident from the FIG. 2 the bottom portion 15' is converging and the portions 15,15' terminate in a pointed shape shown as 16 at one of the upper edges the section 11. By means of such a bottom arrangement a channel 17 is shaped, extending along the whole of the bottom part but tapering in direction towards the upper portion of the section 11, said channel serving the purpose of supplying air via openings 18 and distributed along the whole lower portion of the end wall 13.

In the example described the bottom portions 15,15' are not parallel, but in itself it is within the scope of the invention also when the channel 17 has the same cross sectional area along its whole extension.

In the inclined intermediate bottom portion 15' a number of openings 19 separated from each other are made, said openings being evenly distributed over preferably the whole of the surface of the bottom part or over only a portion of the same. Said openings 19 provide communication between the channel 17 and the sections 11 and 12. Cover plates 20 are rigidly fastened above the openings 19 in such a way that the bottom portion 15' exhibits a stairlike shape. The cover plates 20 are not parallel to the bottom plane 15' but are oriented in a certain small angle relative to said plane. The spacing means 21 (FIG. 6) between the undersides of the plates 20 and the solid surfaces between the openings 19 permit air from the channel 17 to penetrate into the sections 11 and 12. The separate plates are in addition positioned in overlapping arrangement relative to each other, and air slits 22 are formed between the steps. Thus, air is supplied to the openings 19 via the channel 17, and from the openings 19 the air flows into the sections 11 and 12. The bottom portion 14' unlike the portion 15' has a smooth and uninterrupted surface.

The end wall 13 can be provided with a door 23, which can be opened, and the function of which will be described later in the specification.

The upper section 12 of the receptacle 10 in side elevation has a profile, which somewhat resembles the design of the section 11, comprising a plane and an inclined top portion 24 and 25 respectively, which permits that the section 12 can be arranged inside the section 11. By this design the volume of the device is reduced for transportation purpose. The plane portion 24 has an opening, to which a door 26, which can be opened, and/or a toilet chair is connected. A tube 27 to draw off air is connected to another opening, and this tube should extend above the roof of the building, where the receptacle is installed.

In the embodiment according to the FIGS. 1, 3, 5 and 6 the channel 17 is shaped only by the inclined bottom portions 15 and 15'. The intake of the necessary quantity of air in this case takes place from the widest end of the channel 17 via openings 28 (FIG. 4) extending along the whole width of the receptacle. The area of the channel 17 gradually diminishes to zero value. The bottom portion 15' exhibits a stairlike design according to what has been described above in connection with FIG. 2.

In the embodiment illustrated in the FIGS. 3, 4, 5 and 6 one end of a limiting wall 29 is attached to the upper portion of the end wall 13, said limiting wall 29 extending all over the entire width of the section 11 and by means of screw holes 31 being connected to the lateral walls of the section 11. The wall 29 has a downwards inclination, its lower end pointing approximately towards the apex of the angle formed by the bottom portions 14 and 15'. The wall 29 serves the purposes of vertically limiting the height of the waste material, and in connection with the relation of the functioning of the device following later on in the present description, said wall will be dealt with more in detail. The wall 29 forms an anchoring means for one end of chutes 30 of semicircular cross section, the other ends of which being fastened by screws to the upper end of the bottom portion 15'. The chutes 30 have a somewhat downwards converging extension and serve the purpose of distributing waste material, which is falling to the bottom. The connection of the chutes 30 with the limiting wall 29 can be made by introducing the ends of the chutes 30 in semicircular openings taken out in the wall 29 for this purpose. The inclined wall 25 of the upper section 12 can be provided with an inspection hole 32 provided with a cover, and the ventilation tube 27, which in this case has a lateral mounting, can be combined with a power driven fan 33. By air being sucked in through the inlet openings 18 and 28 respectively and exhausted by means of the fan 33 a desired but not necessary underpressure is created in the receptacle 10.

If the receptacle according to the invention is mounted in connection with a dwelling house, the heated air is utilized for supply via the openings 18 (FIG. 2) or the openings 28 (FIG. 4). If less favourable temperatures should be ruling, air, which has been heated by known means, can be supplied. It is also possible to mount a heat coil at the bottom of the channel 17, and/or on the cover plates 20 and on the bottom portion 14'(14) in order to obtain and maintain the desired temperature in and around the waste material.

If the device according to the invention is utilized as a dry closet as well as for taking care of kitchen waste, which is to preferable, the door 32 can be utilized as an inlet for such food-leavings. A toilet chair of conventional art then directly or possibly via a connection means (not shown) can be connected to said opening 26. Assuming that the bottom portions 15' and 14' (FIG. 2) or 14,15 (FIG. 3) have been provided with a layer of the starting bed mentioned in the preamble, which in FIG. 3 is indicated at 34, the waste material will land somewhere above the upper cover plates 20, the chutes 30 to some extent by their semicircular design distributing said waste.

The waste material, especially when it has grown somewhat in height, because of the inclination of the bottom portion 15' has turned out to displace itself in downwards direction by its own weight. But during the whole of the time the mixture achieved by the starting bed and the waste material will be subjected to the influence of the air, i.e. it will be aerated via the air slits 22 to the required extent. By the arrangement of the cover plates overlapping each other, the possibilities of the waste material making its way downwards into the channel 17 are non-existant, and therefore said channel always maintains the same open area.

By successively filling waste material through the throw in opening 26, the mixture is thus automatically displaced, and during the whole of the time it is subjected to a continuous thru-flux of air, finally coming to rest on the plane bottom portion 14'(14), where the final compost reaction is taking place. The limiting wall 29 serves the purpose to prevent waste material, the composting process of which has been terminated, from spreading out too much.

The door 23 is used for the removal of ready processed compost material a couple of times per year, and said material can easily and hygienically be spread out on the ground as an earth improving substance. The inclining bottom portions 15' serves the purpose of directly receiving the waste material, while the plane bottom portion 14' and 14 respectively can be defined as an indirect receiver.

The receptacle according to the invention is made of a plastic material such as PVC, which well resists attacks by substances produced during the composting cycle. In case of electrical heating means being employed, such means can be connected with the lighting network.

What I claim is:

1. Receptacle for the production of earth improving substance from organic waste, comprising an inverted top section and a bottom section, said sections having congruent trapezoidal vertical cross sections and the top section being turned 180° in the horizontal plane relative to the bottom section and detachably mounted upon the bottom section to form a lid therefor, the dimensions of one of said sections being smaller than those of the other section in order to house the major part of said one section within said other tray for transportation when inverted and turned 180°, an inner bottom within said bottom section having an inclined portion and defining an air space therebelow, at least part of said inclined portion being of staircase shape with oblique steps formed by plates with slots and spacers between adjacent steps, whereby adjacent plates partly overlap each other to prevent waste from penetrating said slots, air inlet means communicating with said air space and through said slots with the waste receiving interior of said receptacle, and air outlet means for leading air out of said interior.

2. Receptacle according to claim 1, having inverted chutes of semicircular cross section attached to and sloping downwards from the upper part of said inclined portion to a limiting wall extending downwards from the upper end of an opposed part of the bottom section.

3. Receptacle according to claim 1, wherein the area of a horizontal cross section of said air space is gradually increasing as the section is taken from the upper part of said inclined portion downwardly to the bottom portion of said inclined portion.

4. Receptacle according to claim 1, wherein the area of a horizontal cross section of said air space is gradually decreasing as the section is taken from the upper part of said inclined portion downwardly to the bottom portion of said inclined portion.

* * * * *